Feb. 20, 1968  F. H. MAY  3,369,867
METHOD OF PRODUCING POTASSIUM SULFATE
Filed May 14, 1964
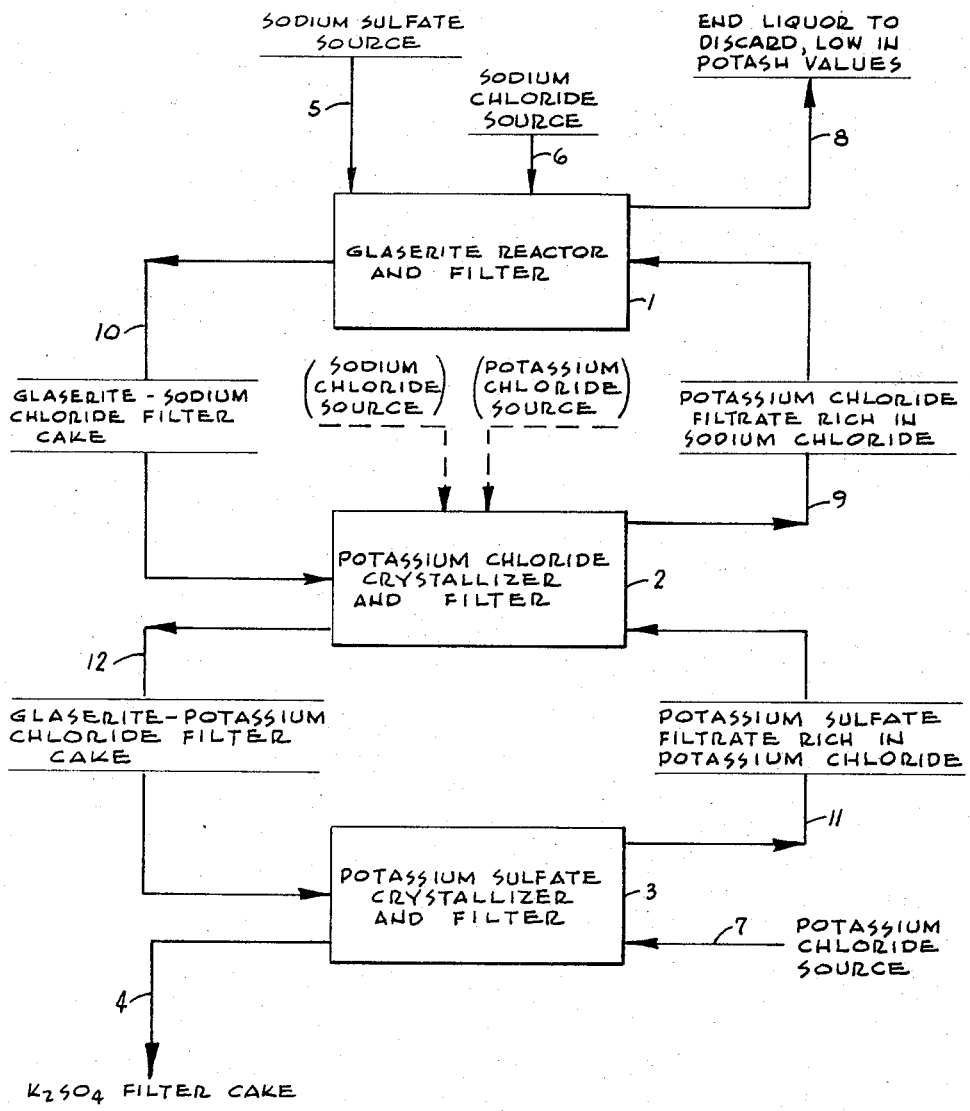
INVENTOR.
FRANK H. MAY
BY
ATTORNEY.

United States Patent Office 3,369,867
Patented Feb. 20, 1968

3,369,867
METHOD OF PRODUCING POTASSIUM SULFATE
Frank H. May, Whittier, Calif., assignor to American Potash & Chemical Corporation, Los Angeles, Calif., a corporation of Delaware
Filed May 14, 1964, Ser. No. 367,531
7 Claims. (Cl. 23—121)

ABSTRACT OF THE DISCLOSURE

A cyclic three-step process for the manufacture of potassium sulfate from raw materials which contain sodium sulfate. The sulfate-containing raw material is first reacted with KCl values contained in a liquor recovered from the other two steps in the process to form a slurry of glaserite and sodium chloride solids in an end liquor which is low in potassium values. The glaserite and sodium chloride solids are conveyed to a second step where the sodium chloride is dissolved in filtrate recycled from the third step, whereby sodium chloride is dissolved into the filtrate and potassium chloride is crystallized therefrom to form a slurry of glaserite and potassium chloride solids. These solids are conveyed to a third step in which the glaserite is reacted with additional KCl to crystallize potassium sulfate as the solid product. The crystallized potassium sulfate is filtered and recovered.

The present invention relates to the production of potassium sulfate. More particularly, the present invention relates to a multistage counter current process for producing potassium sulfate.

Previously, considerable difficulty was experienced in producing potassium sulfate because, in general, the prior processes could not be operated efficiently without recovering the potash values remaining in the end liquor from the process. Generally, prior processes were very limited in their choice of raw materials.

The present invention overcomes the difficulties encountered previously by providing a process which may be operated, using a wide variety of raw materials, at optimum efficiency to produce a very pure potassium sulfate product, and an end liquor so low in potash values that it may economically be discarded.

It is known that potassium sulfate may be produced by first preparing glaserite which is then reacted with potassium chloride to produce potassium sulfate. Such a process is described in U.S. Patent No. 1,936,070, issued Nov. 21, 1933 to Ritchie et al. and assigned to the same assignee as the present invention.

This process involves one or both of the systems:

(1) $Na_2Cl_2$—$K_2Cl_2$—$Na_2SO_4$—$K_2SO_4$—$H_2O$, and
(2) $Na_2Cl_2$—$K_2Cl_2$—$Na_2SO_4$—$K_2SO_4$
    —$Na_2CO_3$—$K_2CO_3$—$H_2O$ Certain of the equilibrium data and phase diagrams for these systems are described in the literature, see, for example, Teeple, J. E., "The Industrial Development of Searles Lake Brines" (1929), particularly system III on page 76 and system VI on page 100.

Both of these systems, at temperatures between about 20° and 100° C., contain three triple points which are involved in producing potassium sulfate from glaserite. In the first system, liquor at the first triple point is saturated with sodium chloride, sodium sulfate and glaserite; at the second triple point with sodium chloride, potassium chloride and glaserite; at the third triple point with potassium chloride, potassium sulfate and glaserite. In the second system, an additional phase consisting of burkeite appears at about the first triple point. Generally, the process is not operated at the second and third triple points in the second system so that the appearance of additional sodium carbonate containing phases at these points does not affect the process. Minor amounts of other salts such as, magnesium salts, borates, bicarbonates, borax, boric acid, phosphates, small amounts of calcium salts and the like do not materially alter the process so long as their concentrations do not reach their saturation points.

Broadly, the present process involves three steps, each of which produces a filter cake and a filtrate. The resultant filter cakes move counter current to the filtrate streams. Each step requires a reaction vessel, such as a crystallizer, wherein the reactions to be accomplished in that step are carried out. Also, each step requires a phase separating device, such as a filter or centrifuge, to separate the solids from the filtrate.

The first filter cake consists of glaserite and, preferably, sodium chloride, the second of glaserite and potassium chloride, and the third is potassium sulfate.

The first reactor is operated at a point at which the mother liquor in the reactor, and thus the first step filtrate, is saturated with respect to glaserite and sodium chloride. The composition of the mother liquor in this first step is preferably approaching saturation with sodium sulfate. It will also be approaching saturation with burkeite, if sodium carbonate is contained in the raw material. The composition of the filtrate, as it leaves the filter in the first step, is generally at about the composition of the first triple point in these systems.

The mother liquor in the second step, and thus the second filtrate, is saturated with both glaserite and potassium chloride. The composition of this second filtrate may be at any point between the second and third triple points in these systems. This flexibility in choosing the second filtrate composition is an essential feature of this invention and permits this process to be operated continuously and efficiently with a wide variety of raw materials.

The composition of the mother liquor in the third step, and thus the third step filtrate, is saturated only with potassium sulfate. Preferably, the composition of the third filtrate is approaching that of the third triple point in this system.

In the first step a reaction takes place between the second step filtrate and the raw materials. This reaction is essentially one wherein a source of sodium sulfate and potassium chloride are digested together to produce glaserite according to the equation:

$$4Na_2SO_4 + 6KCl \rightarrow Na_2SO_4 \cdot 3K_2SO_4 + 6NaCl$$

If burkeite is used as the source of sodium sulfate, the reaction is as follows:

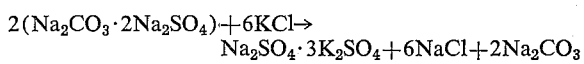
$$2(Na_2CO_3 \cdot 2Na_2SO_4) + 6KCl \rightarrow$$
$$Na_2SO_4 \cdot 3K_2SO_4 + 6NaCl + 2Na_2CO_3$$

Most, if not all, of the potassium chloride required in these reactions is supplied by the second step filtrate. The amount of potassium chloride required in the first step varies with and is dictated by the nature of the raw materials at a given temperature. If the raw materials contain considerable amounts of potash values, the amount of potassium chloride required, to produce a given amount of glaserite, will be considerably less than in the instance where the raw materials contain no potash values.

This first reaction is carried out in a glaserite reactor, and the solids and liquor are separated. Preferably, as much of the filtrate as possible is extracted from the solids before they are conveyed to the next step. To this end, a filter or centrifuge is used in preference to a settler in separating the solids from the filtrate.

The raw materials, sodium sulfate and sodium chloride, are generally added at this first step. Some potash values in the form of potassium chloride, impure potassium sulfate or impure glaserite are also generally added at this step. It is to be understood that the term "potash" as used in the present specification and claims refers to $K_2O$ values. The filtrate from this step is the end liquor from the process. As a part of the first step, the raw materials are preferably pulped with filtrate from the glaserite filter. Two separate vessels are preferably used in this first step. The raw materials are pulped in one vessel and the glaserite solids are withdrawn from the other vessel. This step is preferably carried out in two parts to insure that the end liquor is as low as possible in potash values and that the maximum amount of glaserite is produced. The liquor formed in this pulping step is the end liquor from the process. The pulping step should be operated at as low a temperature and as high a sodium chloride concentration as possible so as to keep the potassium concentration at a minimum. The pulped raw materials are conveyed to the glaserite reactor as a settled slurry. The liquor from the pulping operation in this first step is so low in potash values that it may economically be discarded.

The glaserite-sodium chloride filter cake produced in the first step is taken to a potassium chloride crystallizer wherein it is contacted with potassium sulfate filtrate which is rich in potassium chloride. In the second step, sodium chloride dissolves and is replaced by potassium chloride, which precipitates in the glaserite cake. The potassium chloride filtrate which is rich in sodium chloride is conducted to the first step. The amount of potassium chloride going to the first step in this filtrate is determined by the amount of sodium chloride present in the potassium chloride crystallizer.

The glaserite-potassium chloride filter cake from the second step is conducted to the third and last step of the process wherein it is digested with additional potassium chloride according to the equation:

$$Na_2SO_4 \cdot 3K_2SO_4 + 2KCl \rightarrow 4K_2SO_4 + 2NaCl$$

The potassium sulfate product precipitates in this third step. The filtrate from the third step is conducted to the second, that is, the potassium chloride crystallizing step.

Inclusion of the second step in this process permits the first step to be operated under optimum conditions. Because of the potassium chloride crystallizing step, the glaserite crystallizer can be operated under those conditions which permit recovery of the maximum amount of potash value from the first step filtrate before it is discarded. Operation of the first step under these conditions generally results in the precipitation of substantial amounts of sodium chloride in the glaserite filter cake. If carried directly to the potassium sulfate step, this sodium chloride would reduce the efficiency of potash recovery. In this process, sodium chloride is not objectionable because it is removed in the second step before it reaches the potassium sulfate step. In fact, this sodium chloride is desirable because it is used to regulate the amount of potassium chloride which is carried to the first step by the second step filtrate.

A considerable amount of potassium chloride is present in the third step filtrate when this step is carried out under optimum conditions. This filtrate, generally, contains more potassium chloride than is required in the first step, particularly, when the raw materials contain some potash values. Any excess potash in the first step filtrate is discarded in the end liquor. This is highly undesirable because the potash is the most valuable component of the system.

The excess potassium chloride is recovered from the third step filtrate, according to the invention, when this filtrate is contacted, in the second step, with the glaserite-sodium chloride filter cake from the first step. The amount of sodium chloride present in this second step determines the amount of potassium chloride which will be salted out. The ability to adjust the amount of potassium chloride supplied to the first step, independently of that present in the third step filtrate, permits great flexibility in the choice of raw materials. In general, the glaserite-sodium chloride filter cake contains from about 5 to about 35 weight percent sodium chloride and the third step filtrate contains from about 15 to about 30 weight percent potassium chloride.

The solubility relationships of sodium chloride and potassium chloride are such that, in liquors saturated with potassium chloride and glaserite and having compositions between the second and third triple points, sodium chloride may be made to salt out potassium chloride. Sodium chloride also acts to salt out potash values as glaserite in the first step, thus reducing the concentration of potash values in the end liquor. The sodium chloride concentration in the second filtrate can be adjusted to a predetermined level to achieve optimum potassium chloride concentration.

Concentrations of the mixtures in all of the steps are kept at such levels that evaporation of a part of the water is not necessary to cause the precipitation of the desired inorganic salts. Because of these high concentrations, each step is essentially a digestion operation wherein filtrate from the subsequent step is admixed with filter cake from the preceding step, in the second and third steps, or raw materials in the first step.

The filter cakes in each step are washed with wash water or filtrate according to conventional operating procedures. The cake wash streams are preferably recombined with some filtrate stream rather than being discarded.

For a more complete understanding of the present invention, reference is made to the attached drawing in which a schematic diagram of this process is shown.

In the drawing, 1 is the first step of the process, wherein digestion, crystallization and filtration produce a glaserite-sodium chloride filter cake. Potassium chloride is salted out in step 2 in a potassium chloride digestor crystallizer. Filtration of the slurry produced in this step produces a glaserite-potassium chloride filter cake. The desired potassium sulfate product is produced in step 3 by the digestion of the step 2 glaserite-potassium chloride filter cake with additional potassium chloride. The potassium sulfate product of step 3 is recovered at 4 as a filter cake.

The raw materials for this process are a source of sodium sulfate 5, a source of sodium chloride 6 and a source of potassium chloride 7. The sodium sulfate source 5 and the sodium chloride source 6 are added at step 1, while the potassium chloride source 7 is added at step 3. Preferably, all of the potassium chloride source is added at step 3. However, optionally, a portion of the potassium chloride source may be added in either of steps 1 or 2. A portion of the sodium chloride source may also be added to the second step. The end liquor from the process is discarded from step 1 at 8.

Within the process, the filtrate streams move counter current to the filter cakes. The potassium chloride filtrate at 9 moves from step 2 to step 1 while the glaserite-sodium chloride filter cake at 10 moves from step 1 to step 2. Likewise, between steps 2 and 3, the potassium sulfate filtrate at 11 moves from step 3 to step 2, while the glaserite-potassium chloride filter cake at 12 moves from step 2 to step 3.

Conveniently, a portion of the filtrate stream at 9 may be used to wash the filter cake at 10 before this cake enters the step 2 crystallizer. Likewise, a portion of the stream at 11 may be used to wash the cake at 12. The raw materials at 5 and 6 may be contacted with the end liquor at 8 before the liquor is discarded. The potassium sulfate product may be washed with an aqueous solution of potassium chloride or a barren stream of process water.

Substantially, any sodium sulfate source can be used in the present process. Such sources include: mixed sodium and potassium sulfates, glaserite, burkeite, sodium sulfate and the like, singly or in suitable mixtures of two or more thereof.

The sodium chloride source may be substantially any source and may contain additional salts such as sodium carbonate and the like.

The potassium chloride source, because it is generally added in the potassium sulfate step, is preferably relatively free of extraneous salts other than glaserite and potassium sulfate. When a portion of the potassium chloride source is added to either the glaserite step or the potassium chloride step, that portion may contain other salts such as sodium carbonate and the like. Impure potassium chloride may be used in this process, as the sole source of this material, if it is added to the potassium chloride step rather than the potassium sulfate step.

In order to achieve optimum operating conditions, preferably, the potassium sulfate step is operated at as low a temperature as possible.

In the specification, claims and following specific examples, all parts and percentages are by weight unless otherwise indicated. The following examples are set forth to further illustrate and not to limit the invention.

*Example I*

This example is illusrative of the continuous counter current process of this invention applied to the raw materials glaserite, burkeite, sodium sulfate, sodium chloride and potassium chloride. In this example, the end liquor is discarded at 20° C., the glaserite reactor is operated at 20° C., the potassium chloride crystallizer is operated at 25° C. and the potassium sulfate crystallizer is operated at 30° C.

Raw materials for this process are supplied to the glaserite producing step in the following amounts:

| Raw materials: | Tons/day |
|---|---|
| Burkeite | 50.29 |
| Glaserite | 89.25 |
| $Na_2SO_4$ | 51.11 |
| NaCl | 39.83 |

In the glaserite producing step, the raw materials are pulped with preformed glaserite filtrate and the resulting slurry is allowed to settle to produce a 50 weight percent slurry of raw materials and a process end liquor which is discarded. The discarded end liquor has a temperature of 20° C., is discarded at the rate of 544.66 tons per day and has the composition:

| Constituent: | Weight, percent |
|---|---|
| $Na_2SO_4$ | 8 |
| KCl | 5 |
| NaCl | 17 |
| $Na_2CO_3$ | 3 |
| $H_2O$ | 67 |

The raw materials slurry is digested in the glaserite reactor, at 20° C., with filtrate from the second step. The slurry resulting from this digestion is centrifuged to produce a glaserite-sodium chloride filter cake having the composition:

| Constituent: | Weight, percent |
|---|---|
| Glaserite | 66 |
| $Na_2SO_4$ | 2 |
| NaCl | 32 |

The glaserite-sodium chloride filter cake is conducted to the second step, potassium chloride crystallizer, where it is contacted with a potassium chloride rich filtrate from the third step. The resultant slurry is filtered to produce a second step filtrate which has the following composition:

| Constituent: | Weight, percent |
|---|---|
| $Na_2SO_4$ | 2 |
| KCl | 12 |
| NaCl | 18 |
| $Na_2CO_3$ | — |
| $H_2O$ | 68 |

The second step, glaserite-potassium chloride filter cake has the composition:

| Constituent: | Weight, percent |
|---|---|
| Glaserite | 72 |
| $Na_2SO_4$ | 2 |
| KCl | 26 |

The glaserite-potassium chloride filter cake is conducted to the third step, potassium sulfate crystallizer where it is admixed with an aqueous mixture of potassium chloride and water. The resultant slurry is filtered to produce a filter cake containing 147 tons of potassium sulfate per day and a filtrate having the following composition:

| Constituent: | Weight, percent |
|---|---|
| $Na_2SO_4$ | 2 |
| KCl | 23 |
| NaCl | 5 |
| $H_2O$ | 70 |

The aqueous mixture of potassium chloride is supplied at the rate of 472.57 tons per day and has the following composition:

| Constituent: | Weight, percent |
|---|---|
| KCl | 20 |
| NaCl | 1 |
| $H_2O$ | 79 |

*Example II*

This example is illustrative of the process of this invention applied to the raw materials glaserite, burkeite, sodium sulfate, sodium chloride and potassium chloride. In this example, the end liquor is discarded at 20° C., the glaserite reactor is operated at 20° C., the potassium chloride crystallizer is operated at 24° C. and the potassium sulfate crystallizer is operated at 35° C. This process is operated continuously for a period of 24 hours. Concentrations and conditions are established at each point in the process and are maintained at these values throughout the 24 hour period.

The solids produced in the glaserite reactor are conducted to the potassium chloride crystallizer and the solids produced in the potassium chloride crystallizer are conducted to the potassium sulfate crystallizer. The filtrate produced in the potassium sulfate step is conveyed to the potassium chloride crystallizer and the filtrate produced in the potassium chloride crystallizer is conducted to the glaserite reactor.

The composition of the aqueous mixture in the glaserite reactor is established at the following values:

| Constituent | Weight Percent | |
|---|---|---|
| | Mother Liquor | Solids |
| Glaserite | | 63 |
| $Na_2SO_4$ | 6 | 7 |
| KCl | 7 | |
| NaCl | 16 | 30 |
| $Na_2CO_3$ | 6 | |
| $H_2O$ | 67 | |

The composition of the aqueous mixture in the potassium chloride crystallizer is established and maintained at the following values:

| Constituent | Weight Percent | |
|---|---|---|
| | Mother Liquor | Solids |
| Glaserite | | 75 |
| $Na_2SO_4$ | 2 | 2 |
| KCl | 12 | 23 |
| NaCl | 18 | |
| $Na_2CO_3$ | Trace | |
| $H_2O$ | 68 | |

The composition of the aqueous mixture in the potassium sulfate crystallizer is established and maintained at the following values:

| Constituent | Weight Percent | |
|---|---|---|
| | Mother Liquor | Solids |
| $K_2SO_4$ | | 100 |
| $Na_2SO_4$ | 2 | |
| KCl | 22 | |
| NaCl | 5 | |
| $H_2O$ | 71 | |

The filtrate from the glaserite filter is used to pulp a portion of the raw materials before these materials are introduced into the glaserite reactor. The end liquor from the process is that liquor which is separated from the pulped raw materials. This end liquor has the composition:

Constituent: Weight, percent
$Na_2SO_4$ ---------------------------------- 8
KCl ---------------------------------- 5
NaCl ---------------------------------- 16
$Na_2CO_3$ ---------------------------------- 4
$H_2O$ ---------------------------------- 67

The mother liquors in each of the glaserite reactor, the potassium chloride crystallizer and the potassium sulfate crystallizer are presumed to have the same composition as the filtrates from the these steps. The filter cakes produced in each of these steps are presumed to have the same compositions as the solids in the aqueous mixtures of these steps.

The mother liquor in the glaserite reactor is saturated with respect to glaserite and sodium chloride and is approaching saturation with burkeite.

The mother liquor in the potassium chloride crystallizer is saturated with respect to glaserite and potassium chloride and is approaching saturation with sodium chloride, while the mother liquor in the potassium sulfate crystallizer is saturated with respect to potassium sulfate and is approaching saturation with potassium chloride and glaserite.

Over a 24 hour period, 147.0 tons of potassium sulfate are produced and 548.06 tons of end liquor are discarded. Raw materials supplied to the potassium sulfate crystallizer are as follows:

Constituent: Tons
KCl ---------------------------------- 104
NaCl ---------------------------------- 3
$H_2O$ ---------------------------------- 374

Raw materials supplied to the raw materials pulper in the first step are as follows:

Constituent: Tons
Burkeite ---------------------------------- 75
Glaserite ---------------------------------- 77
$Na_2SO_4$ ---------------------------------- 44
NaCl ---------------------------------- 29

During the 24 hour period for which this process is operated, 213.7 tons of glaserite filter cake are transferred to the potassium chloride crystallizer and 529.23 tons of filtrate from the potassium sulfate filter are transferred to the potassium chloride crystallizer. About 11.37 tons of filtrate are entrained in the potassium sulfate filter cake when it is removed from the process. Based on the potash values in the raw materials and the product, the efficiency of this process is 80.5%.

*Example III*

This example is illustrative of the process of this invention applied to the raw materials potassium sulfate, sodium sulfate, sodium chloride, sodium carbonate and potassium chloride. In this example, the end liquor is discarded at 40° C., the glaserite reactor is operated at 40° C., the potassium chloride crystallizer is operated at 35° C., and the potassium sulfate crystallizer is operated at 30° C. This process is operated continuously for a period of 24 hours. Concentrations and conditions are established at each point in the process and are maintained at these values throughout the 24 hour period. The procedures used in this example are the same as those described in Example II above.

The raw materials supplied to the process during this period, exclusively of the potassium chloride are as follows:

Constituent: Tons
$K_2SO_4$ ---------------------------------- 72
$Na_2SO_4$ ---------------------------------- 98
NaCl ---------------------------------- 44
$Na_2CO_3$ ---------------------------------- 12

These raw materials are supplied to a raw materials pulper. The material composition in the raw materials pulper is as follows:

| Constituent | Tons Mother Liquor | Tons/100 Tons $H_2O$ | Tons Solids |
|---|---|---|---|
| Glaserite | | | 120 |
| $Na_2SO_4$ | 52 | 10 | 33 |
| KCl | 53 | 10 | |
| NaCl | 136 | 27 | 59 |
| $Na_2CO_3$ | 17 | 3 | 12 |
| $H_2O$ | 514 | 100 | |

The solids in the raw materials pulper are settled to a 50 weight percent slurry and the settled liquor is discarded as the end liquor from the process. This end liquor has the material composition:

| Constituent | Tons Liquor | Tons/100 Tons $H_2O$ | Weight Percent |
|---|---|---|---|
| $Na_2SO_4$ | 37 | 10 | 7 |
| KCl | 38 | 10 | 7 |
| NaCl | 97 | 27 | 18 |
| $Na_2CO_3$ | 12 | 3 | 2 |
| $H_2O$ | 366 | 100 | 66 |

The 50 percent slurry from the raw materials pulper is conducted to the glaserite reactor. The material composition in the glaserite reactor is as follows:

| Constituent | Tons Mother Liquor | Tons/100 Tons $H_2O$ | Tons Solids |
|---|---|---|---|
| Glaserite | | | 146 |
| $Na_2SO_4$ | 32 | 6 | 5 |
| KCl | 74 | 14 | |
| NaCl | 141 | 27 | 73 |
| $Na_2CO_3$ | 17 | 3 | |
| $H_2O$ | 531 | 100 | |

The filtrate from the glaserite reactor is conducted to the raw materials pulper and the solids from the glaserite reactor, containing 10% liquor are conducted to the potassium chloride crystallizer.

The material composition within the potassium chloride crystallizer is as follows:

| Constituent | Tons Mother Liquor | Tons/100 Tons $H_2O$ | Tons Solids |
|---|---|---|---|
| Glaserite | | | 146 |
| $Na_2SO_4$ | 11 | 3 | 5 |
| KCl | 78 | 10 | 44 |
| NaCl | 103 | 27 | |
| $Na_2CO_3$ | 1 | Trace | |
| $H_2O$ | 390 | 100 | |

The wet solids, containing 5.9 weight percent liquor, from the potassium chloride crystallizer, are conducted to the potassium sulfate crystallizer. The filtrate from the potassium chloride crystallizer is conducted to the glaserite reactor.

The material compositon in the potassium sulfate crystallizer is as follows:

| Constituent | Tons Mother Liquor | Tons/100 Tons H₂O | Tons Solids |
|---|---|---|---|
| K₂SO₄ | | | 147 |
| Na₂SO₄ | 10 | 3 | |
| KCl | 122 | 32 | |
| NaCl | 27 | 7 | |
| H₂O | 382 | 100 | |

The potassium sulfate filter cake produced in the potassium sulfate crystallizer has the following material composition:

| Constituent | Liquid Entrained | K₂SO₄ |
|---|---|---|
| | | 147 |
| Na₂SO₄ | Trace | |
| KCl | 3 | |
| NaCl | Trace | |
| H₂O | 8 | |

The filtrate from the potassium sulfate crytsallizer, at the rate of 529.23 tons per day, is conducted to the potassium chloride crystallizer. Potassium chloride raw material is supplied to the potassium sulfate crystallizer. The potassium chloride containing raw materials are supplied in the following amounts:

Constituent: Tons
KCl _____ 104
NaCl _____ 3
H₂O _____ 374

Example IV

This example is carried out using the same procedures and at the same temperatures as Example II above.

The raw materials supplied to the process, exclusive of the potassium chloride, are as follows:

Constituent: Tons
K₂SO₄ _____ 63
Na₂SO₄ _____ 106
NaCl _____ 38
Na₂CO₃ _____ 20

These raw materials are supplied to a raw materials pulper. The material composition in the raw materials pulper is as follows:

| Constituent | Tons Mother Liquor | Tons/100 Tons H₂O | Tons Solids |
|---|---|---|---|
| Glaserite | | | 108 |
| Na₂SO₄ | 52 | 10 | 44 |
| KCl | 53 | 10 | |
| NaCl | 136 | 27 | 53 |
| Na₂CO₃ | 27 | 5 | 20 |
| H₂O | 513 | 100 | |

The solids in the raw materials pulper are settled to a 50 weight percent slurry and the liquor is discarded as the end liquor from the process. This end liquor has the material composition:

| Constituent | Tons Liquor | Tons/100 Tons H₂O | Weight Percent |
|---|---|---|---|
| Na₂SO₄ | 37 | 10 | 7 |
| KCl | 38 | 10 | 7 |
| NaCl | 97 | 27 | 17 |
| Na₂CO₃ | 20 | 5 | 4 |
| H₂O | 366 | 100 | 65 |

The 50 percent slurry from the raw materials pulper is conducted to the glaserite reactor. The material in the glaserite reactor is as follows:

| Constituent | Tons Mother Liquor | Tons/100 Tons H₂O | Tons Solids |
|---|---|---|---|
| Glaserite | | | 134 |
| Na₂SO₄ | 32 | 6 | 15 |
| KCl | 74 | 14 | |
| NaCl | 140 | 27 | 66 |
| Na₂CO₃ | 28 | 5 | |
| H₂O | 528 | 100 | |

The filtrate from the glaserite reactor is conducted to the raw materials pulper and the solids from the glaserite reactor, containing 10% liquor, are conducted to the potassium chloride crystallizer.

The material composition within the potassium chloride crystallizer is as follows:

| Constituent | Tons Mother Liquor | Tons/100 Tons H₂O | Tons Solids |
|---|---|---|---|
| Glaserite | | | 146 |
| Na₂SO₄ | 11 | 3 | 5 |
| KCl | 78 | 20 | 36 |
| NaCl | 103 | 27 | |
| Na₂CO₃ | 1 | Trace | |
| H₂O | 390 | 100 | |

The wet solids, containing 6.5 weight percent liquor, from the potassium chloride crystallizer, are conducted to the potassium sulfate crystallizer. The filtrate from the potassium chloride crystallizer is conducted to the glaserite reactor.

The material composition in the potassium sulfate crystallizer is as follows:

| Constituent | Tons Mother Liquor | Tons/100 Tons H₂O | Tons Solids |
|---|---|---|---|
| K₂SO₄ | | | 147 |
| Na₂SO₄ | 10 | 3 | |
| KCl | 122 | 32 | |
| NaCl | 27 | 7 | |
| H₂O | 382 | 100 | |

The potassium sulftae filter cake produced in the potassium sulfate crystallizer has the following material composition:

| Constituent | Tons Liquid Entrained | Tons K₂SO₄ |
|---|---|---|
| | | 147 |
| Na₂SO₄ | Trace | |
| KCl | 3 | |
| NaCl | 1 | |
| H₂O | 8 | |

The filtrate from the potassium sulfate crystallizer, at the rate of 529.23 tons per day, is conducted to the potassium chloride crystallizer. Potassium chloride raw material is supplied to the potassium sulfate crystallizer. The potassium chloride raw materials are supplied in the following amounts:

Constituent: Tons
KCl _____ 112
NaCl _____ 3
H₂O _____ 374

This process may be operated under a wide variety of conditions and with a wide variety of raw materials. The glaserite reactor may be operated at any temperature varying between about 20° C. and 100° C. The potassium chloride crystallizer may be operated at any temperature range from about 20° C. to 100° C. Likewise, the potassium sulfate crystallizer may be operated at any temperature between about 20° C. to 100° C. Preferably, the glaserite reactor is operated between about 20° C. and 40° C., the potassium chloride crystallizer is operated between about 20° C. and 40° C. and the potassium sulfate crystallizer is operated between about 25° C. and 35° C.

The solubilities at certain univariant points in the system involved in this process are given in Tables I and II below.

TABLE I.—SOLUBILITIES IN THE SYSTEM $NaCl-KCl-Na_2SO_4-K_2SO_4-Na_2CO_3-K_2CO_3-H_2O$

| Temp', °C. | Grams/100 Grams $H_2O$ | | | | Solid Phases |
|---|---|---|---|---|---|
| | $Na_2SO_4$ | KCl | NaCl | $Na_2CO_3$ | |
| 20 | 11.7 | 7.01 | 24.7 | 5.0 | NaCl, $Na_2SO_4$, Glaserite, Burkeite. |
| 35 | 10.4 | 9.43 | 26.43 | 4.14 | Do. |
| 50 | 9.7 | 11.52 | 27.33 | 3.14 | Do. |
| 75 | 9.2 | 15.36 | 28.31 | 1.53 | Do. |
| 100 | 8.9 | 19.20 | 29.10 | 1.00 | Do. |
| 20 | 5.8 | 8.74 | 18.35 | 22.01 | NaCl, Burkeite, Glaserite, $Na_2CO_3 7H_2O$. |
| 20 | 2.7 | 13.16 | 16.48 | 23.56 | NaCl, KCl, Glaserite, $Na_2CO_3 7H_2O$. |
| 35 | 3.3 | 14.78 | 17.21 | 23.31 | NaCl, Burkeite, Glaserite, $Na_2CO_3 7H_2O$. |
| 35 | 2.8 | 17.59 | 15.71 | 22.70 | NaCl, KCl, Glaserite, $Na_2CO_3 H_2O$. |
| 50 | 3.0 | 21.80 | 17.61 | 18.49 | NaCl, KCl, Burkeite, Glaserite. |
| 75 | 3.5 | 28.91 | 20.36 | 10.74 | Do. |
| 100 | 3.7 | 36.46 | 22.88 | 7.36 | Do. |

TABLE II.—SOLUBILITIES IN THE SYSTEM $NaCl-KCl-Na_2SO_4-K_2SO_4$

| Temp. (°C.) | Grams/100 Grams $H_2O$ | | | | Solid Phases |
|---|---|---|---|---|---|
| | NaCl | KCl | $Na_2SO_4$ | $K_2SO_4$ | |
| 20 | 8.73 | 27.96 | 2.70 | --------- | KCl, $K_2SO_4$, Glaserite. |
| 35 | 8.31 | 32.14 | 2.39 | --------- | Do. |
| 50 | 7.99 | 36.11 | 2.51 | --------- | Do. |
| 70 | 7.45 | 41.81 | 2.78 | --------- | Do. |
| 75 | 6.81 | 43.46 | 2.82 | --------- | Do. |
| 20 | 3.84 | 18.32 | 4.27 | --------- | $K_2SO_4$, Glaserite. |
| 35 | 2.52 | 20.22 | 5.73 | --------- | Do. |
| 50 | 1.18 | 21.93 | 6.79 | --------- | Do. |
| 75 | 6.62 | 14.98 | --------- | 10.86 | Do. |
| 20 | 6.26 | 4.31 | --------- | 10.52 | $K_2SO_4$, Glaserite. |
| 35 | 6.07 | 4.57 | --------- | 12.48 | Do. |
| 50 | 6.37 | 4.58 | --------- | 14.63 | Do. |
| 75 | 5.97 | 4.73 | --------- | 17.96 | Do. |
| 20 | 10.28 | 25.52 | --------- | 2.80 | $K_2SO_4$, KCl, Glaserite. |
| 35 | 9.87 | 26.78 | --------- | 3.42 | $K_2SO_4$, Glaserite. |
| 50 | 8.75 | 28.24 | --------- | 4.09 | Do. |
| 75 | 7.78 | 29.67 | --------- | 5.55 | Do. |
| 20 | 28.37 | 7.73 | 12.19 | --------- | NaCl, $Na_2SO_4$, Glaserite. |
| 35 | 28.83 | 9.50 | 10.57 | --------- | Do. |
| 50 | 28.80 | 11.75 | 9.51 | --------- | Do. |
| 70 | 28.82 | 14.96 | 9.04 | --------- | Do. |
| 75 | 28.75 | 15.86 | 9.05 | --------- | Do. |
| 20 | 28.33 | 15.58 | 3.64 | --------- | NaCl, KCl, Glaserite. |
| 35 | 27.61 | 19.36 | 3.34 | --------- | Do. |
| 50 | 26.89 | 23.27 | 3.24 | --------- | Do. |
| 70 | 26.09 | 28.54 | 3.32 | --------- | Do. |
| 75 | 25.90 | 29.93 | 3.38 | --------- | Do. |
| 20 | 17.16 | 21.85 | 2.58 | --------- | KCl, Glaserite. |
| 35 | 17.18 | 25.75 | 2.55 | --------- | Do. |
| 50 | 18.07 | 29.46 | 2.65 | --------- | Do. |
| 75 | 17.15 | 35.64 | 2.85 | --------- | Do. |
| 20 | 29.33 | 12.69 | 4.91 | --------- | NaCl, Glaserite. |
| 35 | 28.96 | 13.48 | 5.84 | --------- | Do. |
| 50 | 28.97 | 14.22 | 6.84 | --------- | Do. |
| 75 | 28.88 | 15.76 | 8.82 | --------- | Do. |

As will be understood by those skilled in the art, what has been described is the preferred embodiment of the invention; however, many modifications, changes and substitutions can be made therein without departing from the scope and the spirit of the following claims.

What is claimed is:

1. A process of producing potassium sulfate which comprises
   admixing a sodium sulfate-containing material with a second liquid phase containing sodium chloride and potassium chloride to form a first solid phase consisting essentially of glaserite and sodium chloride and a first liquid phase,
   separating said first solid phase from said first liquid phase,
   admixing said first solid phase with a third liquid phase containing potassium chloride whereby the sodium chloride in said first solid phase is dissolved and potassium chloride crystallizes out of said third liquid phase to form a second solid phase consisting essentially of glaserite and potassium chloride and said second liquid phase containing sodium chloride and potassium chloride,
   separating said second solid phase from said second liquid phase,
   conducting said second liquid phase into admixture with said sodium sulfate-containing material,
   admixing said second solid phase with an aqueous mixture of potassium chloride to form a third liquid phase containing potassium chloride, and a third solid phase consisting essentially of potassium sulfate,
   separating said third solid phase from said third liquid phase,
   conducting said third liquid phase into admixture with said second solid phase, and
   recovering the third solid phase consisting essentially of said potassium sulfate.

2. The process as defined in claim 1 in which said first liquid phase is substantially saturated with glaserite and sodium chloride and has a low potash concentration,
   said second liquid phase is substantially saturated with glaserite and potassium chloride, and
   said third liquid phase is saturated with potassium sulfate and contains a substantial amount of potassium chloride.

3. The process as defined in claim 1 in which the amount of potassium chloride present in said third liquid phase is in excess of the stoichiometric amount required to form glaserite from said sodium sulfate-containing material.

4. The process as defined in claim 1 in which said third liquid phase contains about 15 to about 30 weight percent of potassium chloride.

5. The process as defined in claim 1 in which said sodium sulfate-containing material is pulped with said first liquid phase to form a slurry of said material, and said slurry is admixed with said second liquid phase.

6. In a process for producing potassium sulfate from a sodium sulfate-containing material by admixing said sulfate-containing material with an aqueous potassium chloride-containing liquor to form a solid phase consisting essentially of glaserite and sodium chloride and a liquid phase, admixing said glaserite and sodium chloride solid phase with an aqueous mixture of potassium chloride to form potassium sulfate and a mother liquor containing potassium chloride, and recovering said potassium sulfate, the improvements which comprise admixing said mother liquor containing potassium chloride with said glaserite and sodium chloride solid phase whereby the sodium chloride is dissolved in said liquor and potassium chloride crystallizes out of said liquor to form a solid phase containing glaserite and potassium chloride and a liquid phase rich in sodium chloride, admixing said sodium chloride-rich liquid phase with said sulfate-containing material to form said glaserite and sodium chloride solid phase and a liquor low in potash values, admixing said glaserite and potassium chloride solid phase with said aqueous mixture of potassium chloride to form said potassium sulfate and said potassium chloride containing mother liquor, and recycling said potassium chloride-containing mother liquor into admixture with additional glaserite and sodium chloride solid phase material.

7. The process as defined in claim 6 in which said potassium chloride-containing mother liquor contains from about 15 to about 30 weight percent potassium chloride.

References Cited

UNITED STATES PATENTS 1,936,070  11/1933  Ritchie et al. _____ 23—121

FOREIGN PATENTS 410,830  5/1934  Great Britain.

EARL C. THOMAS, *Primary Examiner.*